Feb. 20, 1951 E. E. ENSIGN 2,542,913
METHOD OF ASSEMBLING TORQUE CONVERTERS
Filed Oct. 29, 1947 2 Sheets-Sheet 1
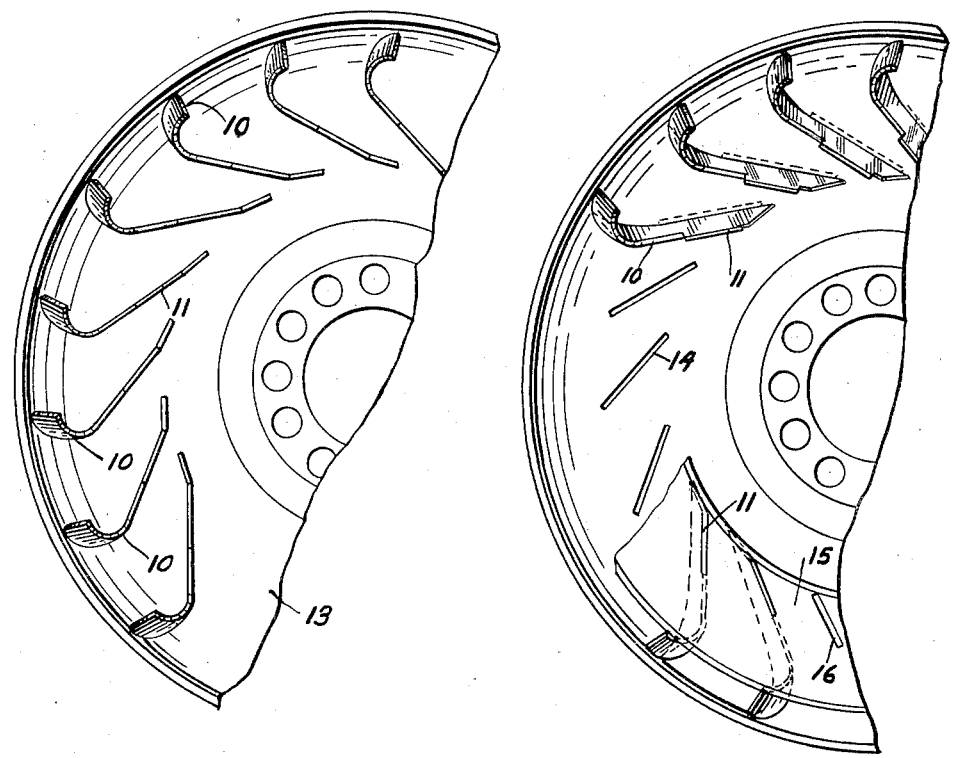
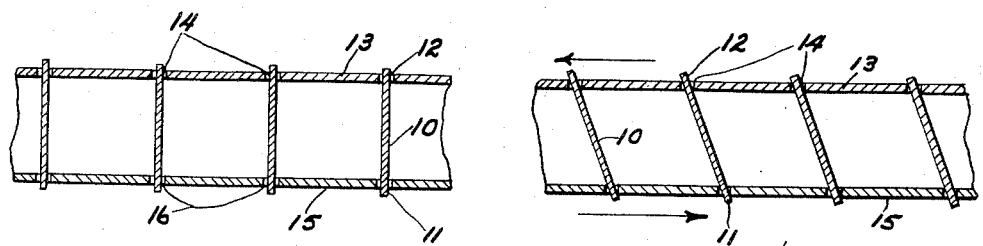
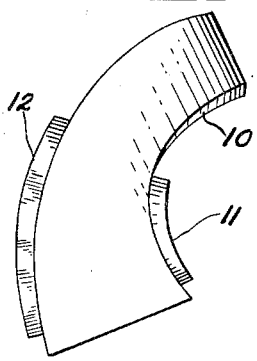
E. E. ENSIGN
INVENTOR.
BY
ATTORNEYS Feb. 20, 1951 E. E. ENSIGN 2,542,913
METHOD OF ASSEMBLING TORQUE CONVERTERS
Filed Oct. 29, 1947 2 Sheets-Sheet 2

E. E. ENSIGN
INVENTOR.
BY
ATTORNEYS

Patented Feb. 20, 1951

2,542,913

UNITED STATES PATENT OFFICE 2,542,913

METHOD OF ASSEMBLING TORQUE CONVERTERS

Elbert Edwin Ensign, Ypsilanti, Mich., assignor to Ford Motor Company, Dearborn, Mich., a corporation of Delaware Application October 29, 1947, Serial No. 782,927

1 Claim. (Cl. 29—156.8)

This invention relates generally to hydraulic torque transmitting devices, and has particular reference to devices of this character which are fabricated principally from sheet metal.

Hydraulic torque transmitting devices such as fluid couplings and torque converters have in the past been fabricated both from castings and from sheet metal assemblies. It has been found extremely difficult to cast torque converter elements by production methods and still obtain the requisite blade contour and finish. Various types of sheet metal designs have also been tried, but here it is found difficult to form and assemble the complexly contoured blades and the supporting shrouds in a manner feasible for high volume production without sacrificing the operating efficiency of the unit. Applicant's invention is therefore directed primarily to the provision of sheet metal torque converters and fluid couplings which lend themselves to relatively simple fabrication and assembly so as to be suitable for mass production and which in addition are capable of attaining the requisite efficiency in operating and performance characteristics.

In one form of the invention, each element of the hydraulic torque transmitting device includes slotted inner and outer sheet metal shrouds together with a series of sheet metal blades or vanes formed with projecting tabs adapted to be inserted through the slots in the shrouds. The entire assembly is hydrogen brazed to form a rigid unit. To hydrogen braze an assembled torque transmitting device it is only necessary to place a source of metallic copper such as a suspension of copper powder or a length of copper wire adjacent the joint and to pass such an assembly through a furnace in a hydrogen atmosphere. This is a simple and reliable method of assembly but suffers from the drawback that all of the joints must be very precisely fitted to ensure reliable brazing. This is due to the fact that the molten copper will not satisfactorily and reliably bridge a gap of more than one or two thousandths of an inch. Hence any joint having a prolonged gap of more than this one or two thousandths of an inch will not be brazed to yield a joint of maximum strength.

In an effort to produce a hydraulic torque transmitting device assembly which could be regularly and successfully brazed, an attempt has been made to produce the vanes and shrouds and the associated slots and tabs to such close tolerances that at no place did the gaps exceed the limitations imposed by the hydrogen brazing process. When it is realized that each member of the torque converter assembly comprises a system of complex curves, the difficulties inherent in such close tolerance work can be readily understood. Even when such tolerances are successfully maintained, it has been found that the task of assembling the two shrouds and the intermediate blades or vanes on a production scale has been impossible. This is due to the necessity of simultaneously inserting a large number of blades between the inner and outer shrouds and the fact that very close tolerances have to be maintained in order to produce a successful braze. Hydraulic torque transmitting devices so assembled have been produced on an experimental basis but have not proven commercially feasible. The construction described below has been developed by the inventor in an effort to retain the advantages of hydrogen brazing as a method of assembling hydraulic torque transmitting devices without the necessity of working to unduly close and commercially impractical tolerances.

Other objects and advantages of this invention will become more apparent as this description proceeds, particularly when considered in connection with the accompanying drawings, in which:

Figure 1 is an axial view of the outer shroud of a hydraulic torque transmitting device with several of the blades in place.

Figure 2 is an axial view of the outer shroud of a torque transmitting device with several of the blades in place and showing a portion of an inner shroud.

Figure 3 is a cross section taken through the hydraulic torque transmitting device as initially assembled.

Figure 4 is a view similar to Figure 3 except that assembly is shown in the position for brazing and as finally assembled.

Figure 5 is an elevation of a single vane showing the associated tabs.

Figure 6:
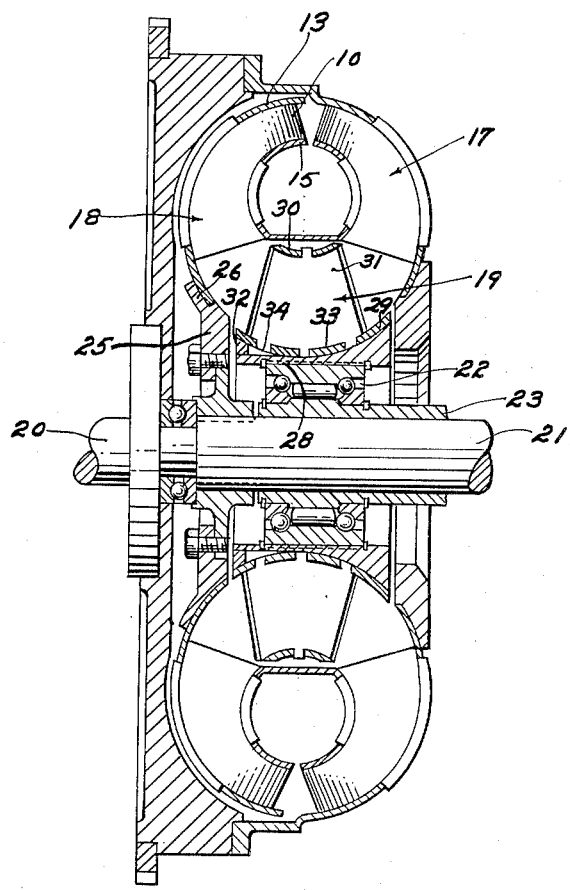
Figure 6 is a cross sectional view of a torque converter embodying the present invention.

Although the present invention is applicable to fluid couplings, torque converters, and other types of hydraulic torque transmitting devices, for the purposes of illustration the invention is shown as embodied in a hydraulic torque converter of the type suitable for automobile use. As shown in the drawings, and particularly in Figure 6, the torque converter comprises the usual three vaned element, namely, pump 17, turbine 18, and reaction member 19. The pump 17 is connected to a driving shaft 20, and the turbine 18 is connected to a driven shaft 21 to supply torque to the latter. The reaction member 19 is connected through an overrunning clutch 22 to a sleeve 23 which is connected to a stationary transmission housing (not shown).

As is well-known, the blades of the pump turbine, and reaction elements of the torque converter must of necessity be of complex three-dimensional curvature to secure the proper operating characteristics and the requisite efficiency. It is this complex blade contour which has been one of the principal factors invovlved in the difficulties encountered in properly assembling sheet metal blades to their supporting shrouds. As will be seen, these problems are surmounted by the present invention.

Inasmuch as the pump and turbine of the torque converter are shown generally similar in construction and design with the exception of the specific blade contour, only the construction of the turbine will be described in detail. As seen in Figure 6, the turbine 18 comprises a hub or adaptor ring 25, an outer shroud 13, an inner shroud 15, and a series of circumferentially spaced blades 10 assembled between the inner and the outer shroud. The outer shroud 13 is an annular dish shaped metal member welded or brazed adjacent its inner edge to the adaptor ring 25. The inner surface of the adaptor ring is recessed at 26 to receive the outer shroud and forms a smooth continuation thereof to eliminate obstacles which might interfere with the smooth flow of a fluid in the circuit.

Attention is now briefly directed to the construction of the reaction member 19. Reaction member 19 comprises a splined sleeve 28, an outer shroud 29, an inner shroud 30, and a series of reaction blades 31 arranged in circumferentially spaced relationship between the inner and outer shrouds. The outer shroud 29 is a sheet metal annulus slightly curved in cross section and is mounted upon and brazed to the outer periphery of the sleeve 28. At one end a ring 32 spaces the shroud 29 from the sleeve 28, while at the opposite edge the sleeve is contoured to fit the curvature of the shroud. The inner shroud 30 is likewise in the form of an annulus. A series of three slots 33 are punched in the outer shroud 29 for each blade, and co-operating tabs 34 are formed upon the adjacent edge of each blade for insertion into the slot.

In Figure 1, a plurality of blades 10 having associated inner tabs 11 and outer tab 12 (Figure 5) are shown placed in a temporary position in outer shroud 13. In Figure 1, outer tabs 12 cannot be seen but have been inserted in the proper slot in outer shroud 13. Reference is here made again to Figure 5 of the drawing which shows a blade detached from the shroud. This blade comprises a curved sheet metal stamping having integral attached inner tab 11 and outer tab 12. The contour of the blade adjacent to outer tab 12 of course corresponds to the contour of the inner annulus of outer shroud 13 and that portion of the blade 10 adjacent to inner tab 11 corresponds to the outer annulus of inner shroud 15.

Figure 2 corresponds to Figure 1 except that inner shroud 15 has been shown with inner tabs 11 of blade 10 inserted through slots 16 in inner shroud 15. In this drawing three of the blades have been omitted to show outer shroud slots 14 into which outer tabs 12 are fitted. In applicant's construction no attempt is made to secure a neat or close fit between slots 14 and 16 and associated tabs 12 and 11. To the contrary, slots 14 and 16 are deliberately cut to provide a clearance of the order of 0.005 to 0.020 of an inch between the tabs and the slots. This clearance is determined by subtracting the thickness of the tab from the width of the slot.

Figure 3 best illustrates this structure with these generous clearances. This figure is a cross section taken through the torque transmission structure and through the tabs. In this drawing the outer shroud slots are designated by 14 and the inner shroud slots by 16. It will be noted that a substantial clearance has been provided between the tabs 11 and 12 and outer shroud 13 and inner shroud 15. By means of these generous clearances, the torque converter is readily assembled in large quantities without the necessity of laborious hand operations.

Ordinarily, these large clearances while very useful in the assembly of the hydraulic torque transmission device would preclude the use of hydrogen brazing as a means for securing the assembly in the final position. However, by adopting the expedient best shown in Figure 4, it becomes possible to regularly braze torque converter assemblies which have been constructed with these generous clearances. This type of brazing is made possible by imparting a relative angular motion to outer shroud 13 and inner shroud 15 and brazing the assemblies in the position assumed after this rotation. This relative angular movement is possible between the inner and outer shrouds because of the clearances provided between tabs 11 and 12 and slots 14 and 16. This angular movement is also limited by these same clearances since the sides of the tabs bind against the slots. To prepare the assembly for brazing the relative angular motion is imparted to the inner and outer shrouds to the limit permitted by such clearances. This relative angular movement causes tabs 12 to bind in slots 14 and tabs 11 to bind in slots 16 as clearly shown in Figure 4. This binding action reduces the effective clearance in so far as the hydrogen brazing process is concerned between the shrouds and the tabs to zero.

Thus, to assemble the complete converter component it is necessary only to place the proper number of blades 10 with the tabs 12 inserted in slots 14 in outer shroud 13. The inner shroud 15 is then applied with tabs 11 bracketed in slots 16. These operations are readily accomplished because of the generous clearances provided. The maximum possible relative rotation is now imparted to inner shroud 15 and outer shroud 13 and a source of copper such as a suspension of copper powder or copper wire is provided around the tabs. A single passage of this assembly through a hydrogen brazing furnace results in a rigid, unitary structure. The copper flows from the points at which the tabs bind against the slots and tends to completely fill the slots.

Applicant's invention has been described as applied to a torque transmission structure such as illustrated in Figure 6. However, the applicant's invention is by no means so limited. For certain purposes the inner shroud shown in Figure 6 may be eliminated entirely. To build such a device, the blades are assembled in the outer shroud as shown in the upper portion of Figure 2 and the brazing accomplished while the structure rests in a horizontal position and the blades are held in the slots in a cocked position by gravity. A structure so produced is, of course, not as rigid as that employing the inner and outer shroud but is adequate for certain purposes.

I claim as my invention:

In the method of assembling a hydraulic torque transmitting device comprising a shroud and blades supported upon said shroud, the steps of providing slots in the shroud and tabs on each blade, said slots being substantially wider than the thickness of the blade, assembling the shroud and the blades with the tabs in the proper shroud slots, cocking the blades to the extent permitted by the width of the slots and brazing the assembly.

ELBERT EDWIN ENSIGN.

REFERENCES CITED

The following references are of record in the file of this patent:

UNITED STATES PATENTS

| Number | Name | Date |
| --- | --- | --- |
| 1,017,215 | Ilg | Feb. 13, 1912 |
| 1,484,579 | Still | Feb. 19, 1924 |
| 2,336,231 | Dodge | Dec. 7, 1943 |

OTHER REFERENCES

The Mag. Product Eng. October 1946, pp. 103–197.